Jan. 8, 1952            H. D. HUME            2,581,661
METHOD OF CUTTING AND HARVESTING VINE AND BUSH CROPS
Filed March 26, 1948            2 SHEETS—SHEET 1
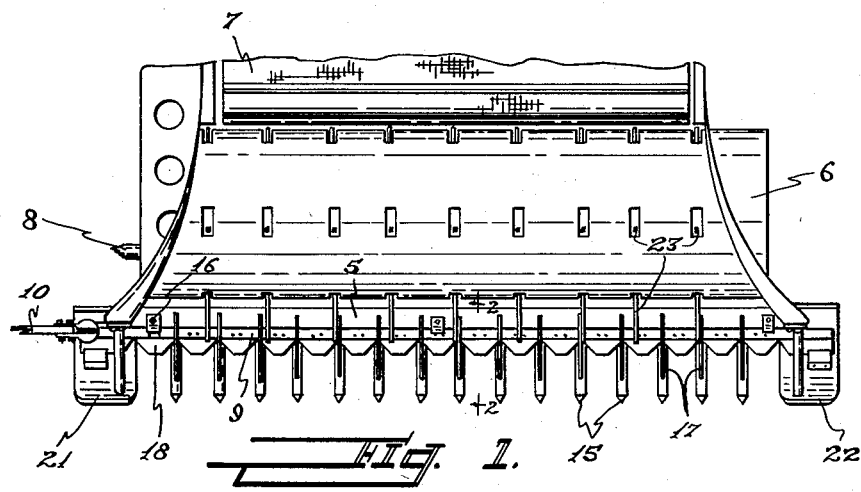
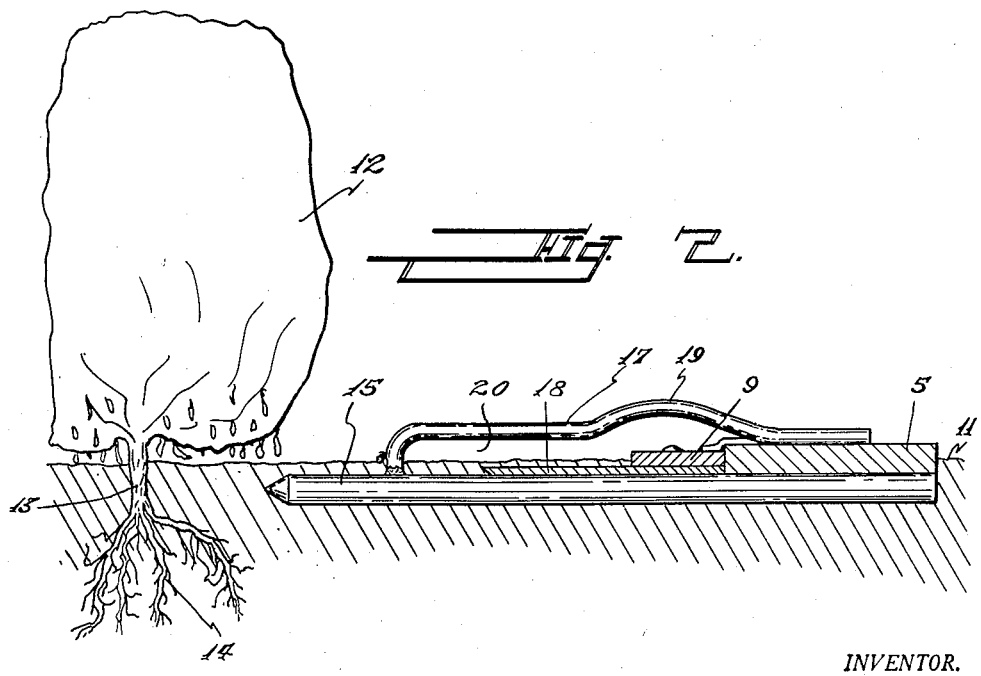
INVENTOR.
Horace D. Hume
BY Jan. 8, 1952        H. D. HUME        2,581,661
METHOD OF CUTTING AND HARVESTING VINE AND BUSH CROPS
Filed March 26, 1948        2 SHEETS—SHEET 2
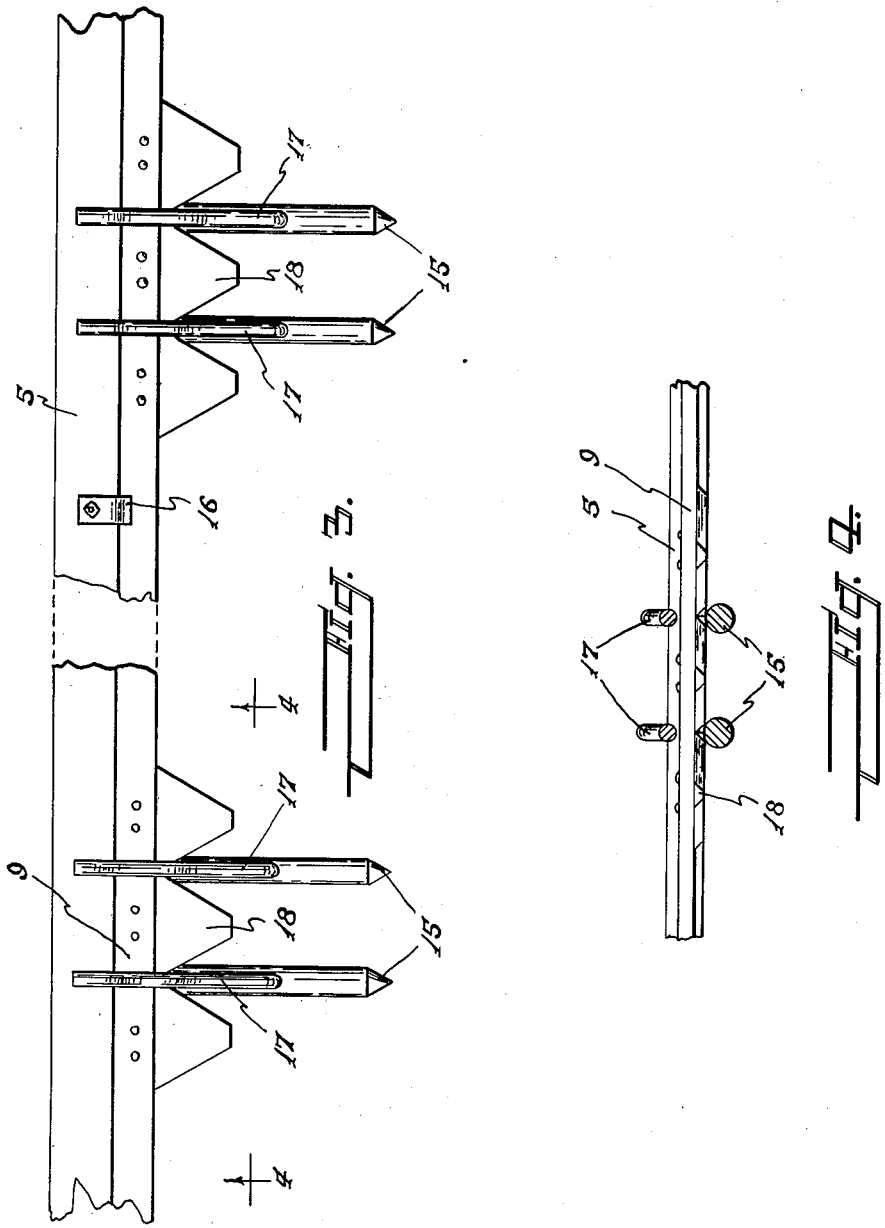
INVENTOR.
Horace D. Hume
BY
Smith & Wells Patented Jan. 8, 1952

2,581,661

UNITED STATES PATENT OFFICE 2,581,661

METHOD OF CUTTING AND HARVESTING VINE AND BUSH CROPS

Horace D. Hume, Mendota, Ill.

Application March 26, 1948, Serial No. 17,327

2 Claims. (Cl. 55—64)

My present invention relates to improvements in method of cutting and harvesting vine and bush crops.

In the harvesting of certain vine and bush crops considerable difficulty is encountered because of the tendency of the seed pods, which are to be saved, to hang so low that cutting with the ordinary mowing device results in too great a loss of the valuable part of the product. Such crops as beans, particularly lima beans, present a very difficult problem. Many of the seed pods hang low enough from the plants to touch the soil. The usual harvesting methods used with grains and seed crops such as peas, clover etc. are not satisfactory with a crop of this nature. The seed pods are firmly attached to the plant so that if the plant can be freed from the ground and picked up with the pods intact, harvesting mechanically may be carried out. The plants have fibrous root systems so that any method of harvesting that takes the root system with the plant, creates another problem of cleaning due to the dirt clinging to the root system. Moreover, pulling of the plants is bad from the soil preservation standpoint, since the roots of the plants are particularly valuable in the soil. Legume plants, for example, are used to increase the available nitrogen in the soil.

It is the purpose of the present invention to improve the cutting of crops of the nature described above, so that, the seed pods will not be damaged, and, the cutting will take place beneath the ground level in such a fashion as to leave the roots of the plant in the soil while the top of the plant is picked up and carried away for harvesting the seed. My improvement is particularly applicable to beans in either the green or ripe state, but is not limited thereto as it may be applied to all crops where the desired part of the plant is close to the ground surface.

More particularly it is the purpose of my invention to provide an improved cutting and pick up mechanism for plants of the nature described above in which the cutting is accomplished immediately below the soil surface by snapping a cutter against the root stem to break off the stem and keep the body of the roots in the soil below the cutter while the top of the plant is picked up.

The nature and advantages of my invention will appear more fully from the following description of a preferred form of the invention, reference being made to the accompanying drawings in which a preferred form of the invention is shown. It should be understood, however, that the drawings and description are illustrative only and should not be considered as limiting the invention except insofar as it is limited by the claims.

In the drawings:

Figure 1 is a fragmentary plan view of a cutting and pick up device embodying my invention;

Figure 2 is an enlarged sectional view taken on the line 2—2 of Figure 1 showing the details of the cutting device and its position relative to the plants which are cut by it;

Figure 3 is an enlarged plan view of a portion of the cutting device, showing part of the knives removed for row cutting; and Figure 4 is a sectional view taken on the line 4—4 of Figure 3.

Referring now to the drawings, my invention is embodied in a harvesting machine which includes a cutting device, a reversely rotating pick up mechanism 6 and a loading conveyor 7. The pick up device 6 and the loading conveyor 7 are of known construction and will be described herein only insofar as it is necessary to show the cooperation thereof with the cutting device. Power is supplied from a suitable source by means of a shaft 8 to the pick up device 6. The cutting device includes a cutter bar 5 and a sickle bar 9. The sickle bar is reciprocated, at a higher rate than is usually employed in harvesting, by a pitman rod 10 from the same source of power that operates the shaft 8. The conveyor 7 is also driven from the power source.

Referring now to Figure 2, in this figure I have indicated the soil level at 11 with the plants 12 in their normal relation to the surface of the soil. Such plants as the various types of beans have a single root stalk 13 from which the top of the plant branches laterally a short distance above the soil. In a like manner the root system indicated at 14, branches downwardly and laterally from the stalk 13 below the soil surface. The root stalk immediately at, and below, the soil surface is rather hard and tough. Unless care is exercised in cutting the stalk, the fibrous root system will be lifted with the plant. According to my invention I provide a novel method and device for penetrating the soil along side the root stalks over the root system and cutting the stalks immediately below the soil surface so the fibrous root system is held down while the plant is lifted.

The construction that I have found particularly successful comprises pairs of rounded pointed fingers 15 which are mounted on the under side of the cutter bar 5 to pass on opposite sides of a row of plants. I prefer to weld the fingers 15 to the cutter bar. The sickle bar 9 is laid on the fingers 15 with the knives 18 on the under side of the sickle bar. Clips 16 are used to hold the sickle bar down. The knives 18 ride over the rounded fingers 15 and have considerable freedom for their tips to move up and down with respect to the fingers 15. A guard rod 17 is fixed on each finger 15 at a substantial distance forward from the sickle knife and extends directly upward so as to leave a space 20 open in front of the knife. The rod 17 is then bent to horizontal position and extends back to the cutter bar where it is secured. The rod 17 is raised slightly at 19 over the sickle bar 9. Preferably I weld the rod 17 to the cutter bar and to the finger 15. The rod 17 is also rounded in cross section. I find that ordinary cylindrical steel rods of the proper diameter is satisfactory material for the parts 15 and 17.

In operation the fingers 15, which are spaced apart at least the width of the knives 18, run along just beneath the surface of the soil. The shoes 21 and 22 keep the fingers 15 from going too deep. Being rounded and pointed at their ends, the fingers 15 do not pull the fibrous roots of the plants. When the plant stalk reaches the knives 18, it is snapped off by the knives which are also operating in the soil. Any pebbles that get in the way of the knives will be deflected by the rounded surfaces of the fingers 15 and the rods 17. Moreover if the soil is sticky, these rounded rods will shed the soil. The cut plants are picked up by the fingers 23 on the pick up device 6 and delivered to the conveyor 7. Thus the seed pods, even though they lie on the ground, are not cut up by the sickle, and, the entire plant, except for the fibrous root growth, is lifted by the fingers 23 without being cut up. The dirt does not have an opportunity to become mingled with the plant since the major part of the plant is over the cutting mechanism before it is disturbed by the cutting of its stalk.

The fingers 15 are long enough to extend well in front of the knives. The fingers act to pin the root system down before the knives reach the stalk. The soil is also loosened by the fingers 15 before the sickle bar 9 and cutter bar 5 have to pass through it.

It is not necessary with row crops to have fingers 15 and knives 18 throughout the length of the cutter bar. The fingers 15 may be arranged in pairs at the proper distance apart to cut two or more rows at a time as illustrated in Figure 3. Enough knives are provided to assure cutting of the plants that pass between a pair of the fingers 15.

It is believed that the nature and advantages of my invention will be apparent from the foregoing description. Having thus described my invention, I claim:

1. A method of harvesting which comprises, pushing spaced apart guides through the soil just below the surface thereof, on opposite sides of the plants to be harvested, cutting the stalks of the plants at the level of the guides while the stalks and roots are held in the soil between the guides, and lifting and carrying away the tops of the plants as they are cut.

2. A method of harvesting row crops which comprises pushing a pair of guides through the soil along the row of plants with one guide on each side of the row and just below the soil surface and cutting the root stalks of the plants transversely while they are between the guides whereby to remove the plant and keep the root system in the soil.

HORACE D. HUME.

REFERENCES CITED

The following references are of record in the file of this patent:

UNITED STATES PATENTS

| Number | Name | Date |
| --- | --- | --- |
| 747,314 | Brakeley | Dec. 15, 1903 |
| 1,345,315 | Byrd | June 29, 1920 |

FOREIGN PATENTS

| Number | Country | Date |
| --- | --- | --- |
| 441,597 | Germany | Mar. 5, 1927 |